(12) United States Patent
Irie

(10) Patent No.: US 11,761,833 B2
(45) Date of Patent: Sep. 19, 2023

(54) STRESS MEASUREMENT DEVICE, STRESS MEASUREMENT SYSTEM, AND STRESS MEASUREMENT METHOD

(71) Applicant: Panasonic Intellectual Property Management Co., Ltd., Osaka (JP)

(72) Inventor: Yousuke Irie, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/085,403

(22) Filed: Oct. 30, 2020

(65) Prior Publication Data

US 2021/0048356 A1    Feb. 18, 2021

Related U.S. Application Data

(63) Continuation of application No. 16/215,691, filed on Dec. 11, 2018, now Pat. No. 10,830,652, which is a
(Continued)

(30) Foreign Application Priority Data

Apr. 26, 2017    (JP) ................. 2017-087587

(51) Int. Cl.
*G01L 1/24*    (2006.01)
*G01K 3/10*    (2006.01)
(Continued)

(52) U.S. Cl.
CPC ............. *G01L 1/248* (2013.01); *G01B 11/16* (2013.01); *G01J 5/0003* (2013.01); *G01K 3/10* (2013.01);
(Continued)

(58) Field of Classification Search
None
See application file for complete search history.

(56) References Cited

U.S. PATENT DOCUMENTS

| 2002/0001073 | A1 | 1/2002 | Lam | |
|---|---|---|---|---|
| 2013/0107004 | A1* | 5/2013 | Maeda | G01B 11/16 348/46 |
| 2017/0360407 | A1* | 12/2017 | Sethuraman | A61N 7/00 |

FOREIGN PATENT DOCUMENTS

| JP | 2007-278842 | 10/2007 |
|---|---|---|
| JP | 2008-232998 | 10/2008 |

(Continued)

OTHER PUBLICATIONS

Montanini, R., et al. "Non-contact measurement of linear thermal expansion coefficients of solid materials by infrared image correlation", Meas. Sci. Technol. 25 (2014) 015013, pp. 1-8, IOP Publishing (2014) (Year: 2014).*

(Continued)

*Primary Examiner* — Lindsay J Uhl
(74) *Attorney, Agent, or Firm* — Wenderoth, Lind & Ponack, L.L.P.

(57) ABSTRACT

A stress measurement device includes a first obtaining unit obtaining thermal data including information indicating a temperature of a measuring region, a second obtaining unit obtaining data related to stress occurring in one part of the measuring region, and a controller finding stress occurring in the measuring region from the thermal data and the data related to the stress. The controller finds, first waveform data respectively on the one part and a part other than the one part based on a change with time of the thermal data, and second waveform data based on a change with time of the data related to the stress. The controller finds, disturbance data through a deduction of the second waveform data from the first waveform data on the one part, and stress data indicat-
(Continued)

ing stress occurring in the part through a deduction the disturbance data from the first waveform data on the part.

11 Claims, 18 Drawing Sheets

Related U.S. Application Data continuation of application No. PCT/JP2018/014514, filed on Apr. 5, 2018.

(51) Int. Cl.
    *G01J 5/00*     (2022.01)
    *H04N 5/33*     (2023.01)
    *H04N 7/18*     (2006.01)
    *G01B 11/16*     (2006.01)
    *G01L 1/00*     (2006.01)
    *G01M 5/00*     (2006.01)
    *G01N 25/20*     (2006.01)
    *G01N 25/72*     (2006.01)
    *G01M 99/00*     (2011.01)
    *G01M 11/08*     (2006.01)
(52) U.S. Cl.
    CPC ............. *G01L 1/00* (2013.01); *G01M 5/0008* (2013.01); *G01M 5/0091* (2013.01); *G01M 11/081* (2013.01); *G01M 99/002* (2013.01); *G01N 25/20* (2013.01); *G01N 25/72* (2013.01); *H04N 5/33* (2013.01); *H04N 7/181* (2013.01); *G01J 2005/0077* (2013.01)

(56) References Cited

FOREIGN PATENT DOCUMENTS

| JP | 4367932 | 11/2009 |
| JP | 4803652 | 10/2011 |
| JP | 2016197080 A | * 11/2016 |

OTHER PUBLICATIONS

R Montanini and F Freni, "Non-contact measurement of linear thermal expansion coefficients of solid materials by infrared image correlation", Meas. Sci. Technol. 25 (2014) 015013, pp. 1-8, IOP Publishing (2014) (Year: 2014).*

International Search Report of PCT application No. PCT/JP2018/014514 dated May 15, 2018.

Extended European Search Report dated Jul. 4, 2019 in related European Patent Application No. 18791968.3.

* cited by examiner

FIG. 5

| Data No. | Correlation coefficient |
|---|---|
| 1 | 0.9458 |
| 3 | 0.8739 |
| 4 | 0.9400 |
| 5 | 0.8771 |
| 6 | 0.9113 |
| 7 | 0.8731 |
| 8 | 0.9150 |
| 9 | 0.9306 |

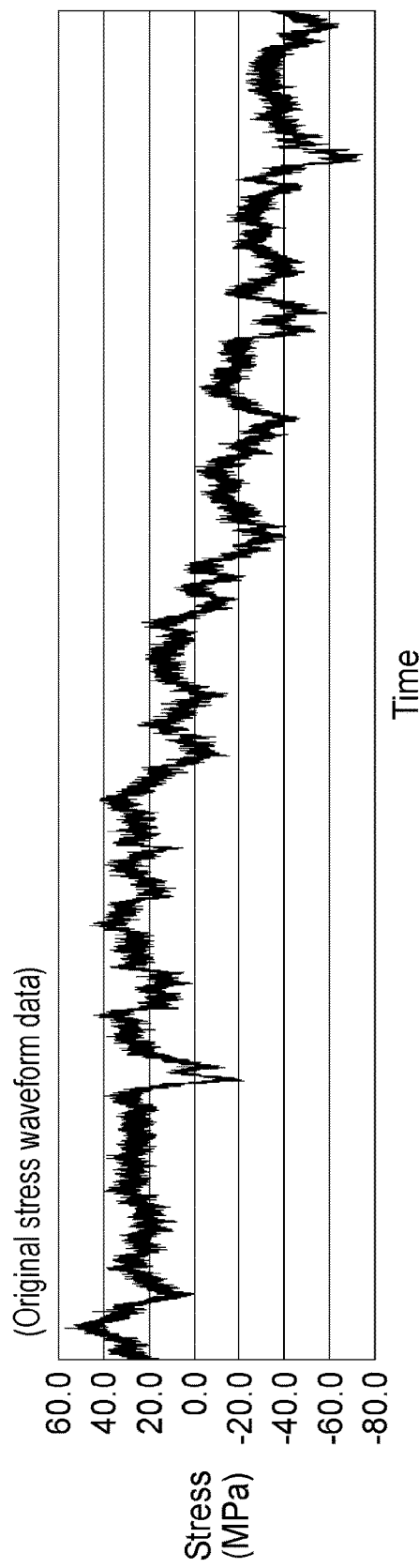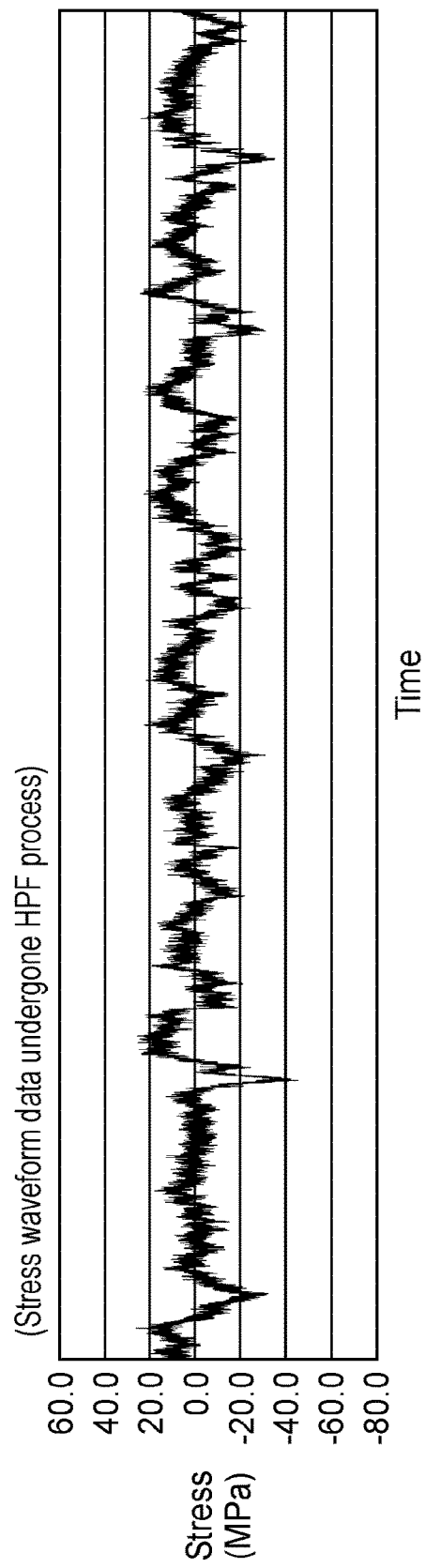

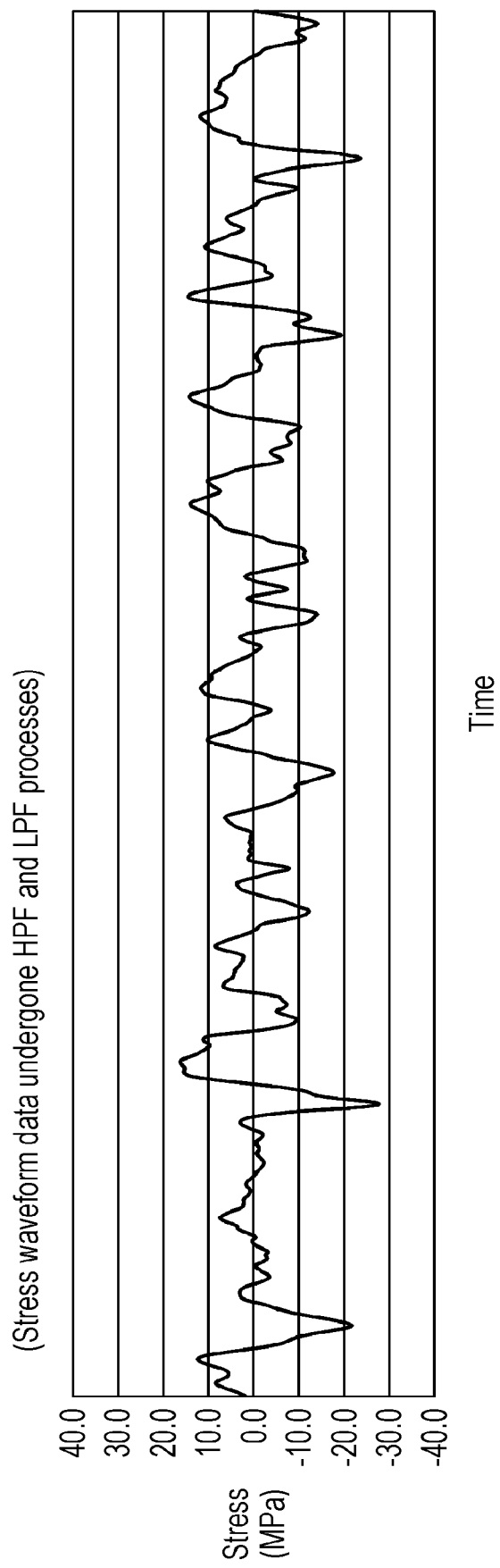

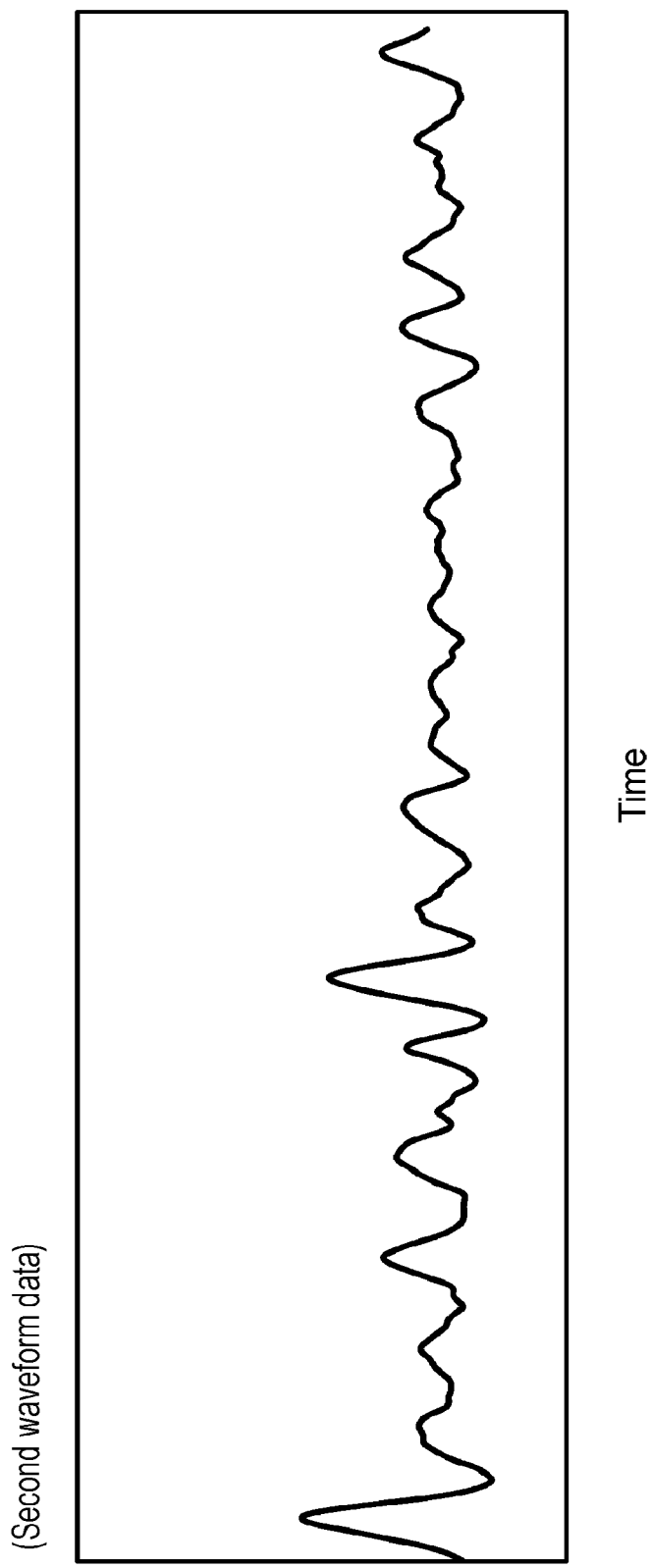

STRESS MEASUREMENT DEVICE, STRESS MEASUREMENT SYSTEM, AND STRESS MEASUREMENT METHOD

BACKGROUND

1. Technical Fields

The present disclosure relates to a stress measurement device for measuring stress occurring in a measuring object from a thermal image of the measuring object.

2. Description of the Related Art

Patent literatures 1 to 3 disclose methods for measuring a distribution of stress fluctuation produced in structures (e.g. bridge) by load travelling thereon, viz. the methods measure a stress distribution. These methods employ an infrared thermography method using an infrared camera. This method allows the infrared camera to measure a distribution of infrared energy radiated from an object surface, and then the method converts this energy distribution into a temperature distribution before displaying it as an image. With the aid of this process, the method for measuring the distribution of stress fluctuation measures a minute temperature fluctuation (i.e. thermos-elastic temperature fluctuation) produced in an object when the object is elastically deformed, thereby measuring a distribution of the stress fluctuation acting on the object.

CITATION LIST

Patent Literature

PTL 1: Unexamined Japanese Patent Application Publication No. 2008-232998
PTL 2: Japanese Patent Publication No. 4803652
PTL 3: Japanese Patent Publication No. 4367932

SUMMARY

The present disclosure provides a stress measurement device, stress measurement system, and stress measurement method for improving an accuracy of a measurement of the stress occurring in a measuring object.

A first aspect of the present disclosure exhibits a stress measurement device comprising the following structural elements:
a first obtaining unit obtaining thermal data including information indicating a temperature of a measuring region of a measuring object;
a second obtaining unit obtaining data related to stress occurring in one part of the measuring region; and
a controller finding stress occurring in the measuring region of the measuring object from the thermal data and the data related to the stress.
The controller finds first waveform data respectively on the one part of the measuring region and a part other than the one part of the measuring region based on a change with time of the thermal data, and then finds second waveform data based on a change with time of the data related to the stress. The controller also finds disturbance data through a deduction of the second waveform data from the first waveform data on the one part of the measuring region, and finds stress data indicating stress occurring in the part other than the one part of the measuring region through a deduction the disturbance data from the first waveform data on the part other than the one part of the measuring region.

A second aspect of the present disclosure exhibits a stress measurement system comprising the following structural elements:
the stress measurement device as defined in the first aspect;
an infrared camera photographing the measuring object, and generating thermal image data as thermal data; and
a laser displacement meter measuring a displacement of the measuring object, and generating displacement data as the data related to the stress.

A third aspect of the present disclosure exhibits a stress measurement method comprising the following steps:
a step of finding first waveform data, based on a change with time of thermal data including information indicating a temperature, on one part of a measuring region of the measuring object and a part other than the one part of the measuring region respectively:
a step of finding second waveform data based on a change with time of data related to stress occurring in the one part of the measuring region;
a step of finding disturbance data through a deduction of the second waveform data from the first waveform data on the one part of the measuring region; and
a step of finding stress data indicating stress occurring in the part other than the one part of the measuring region through a deduction of the disturbance data from the first waveform data on the part other than the one part of the measuring region.

The stress measurement device and the stress measurement method of the present disclosure allow eliminating a disturbance component from the data indicating the stress obtainable from the thermal data, so that an accuracy of measurement stress can be improved.

BRIEF DESCRIPTION OF DRAWINGS

FIG. 5 illustrates a correlation coefficient between a distortion measured with the distortion gauge and a displacement measured with the laser displacement meter.
FIG. 7A shows stress waveform data found from a thermal image.
FIG. 7B shows the stress waveform data shown in FIG. 7A, but having undergone HPF process.
FIG. 7C shows the stress waveform data shown in FIG. 7B, but further having undergone LPF process.

FIG. 11 shows the second waveform data generated based on a value measured with the laser displacement meter in region R2 shown in FIG. 10.

DETAILED DESCRIPTION

Exemplary embodiments of the present disclosure are detailed hereinafter with reference to the accompanying drawings. Descriptions more than necessary will be omitted sometimes. For instance, well-known matters are not always described, or substantially the same structures will not be described repeatedly. These omissions will avoid redundant descriptions and help ordinary skilled persons in the art understand the present disclosure with more ease.

The inventors provide the ordinary skilled persons in the art with the accompanying drawings and the descriptions below for fully understanding the present disclosure, and do not intend these materials to limit the scope of the claims.

First Exemplary Embodiment

The stress measurement system in accordance with the first embodiment is described hereinafter with reference to FIG. 1 to FIG. 14C.

1-1. Structure

Figure 1:
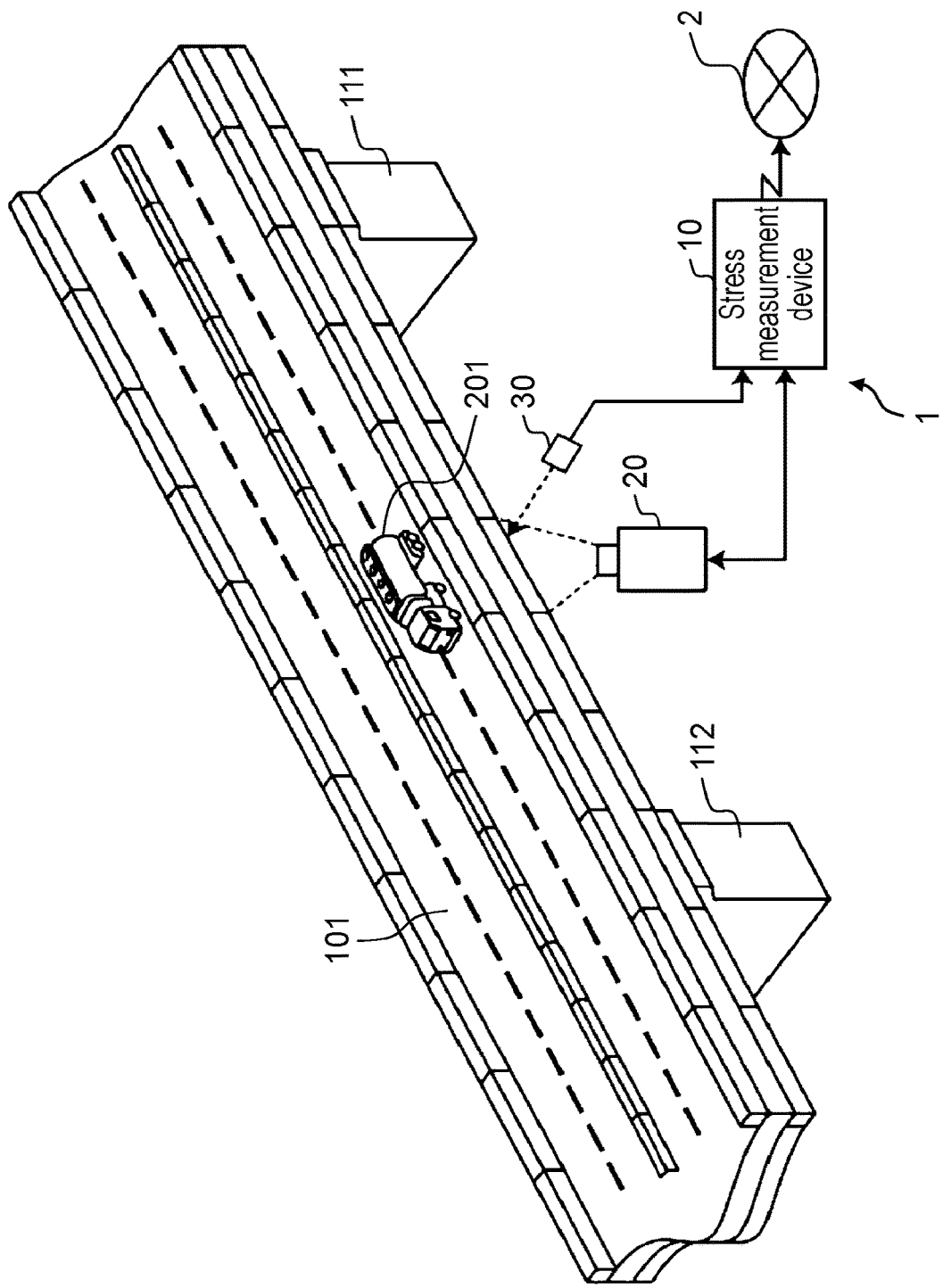
FIG. 1 shows an overall structure of a stress measurement system in accordance with a first embodiment of the present disclosure.

FIG. 1 shows a structure of the stress measurement system in accordance with the first embodiment. Stress measurement system 1 shown in FIG. 1 measures a stress distribution occurring in bridge 101, built on a highway and supported by bridge piers 111 and 112, when vehicle 201 travels on bridge 101. Stress measurement system 1 includes stress measurement device 10, infrared camera 20, and laser displacement meter 30.

Figure 2:
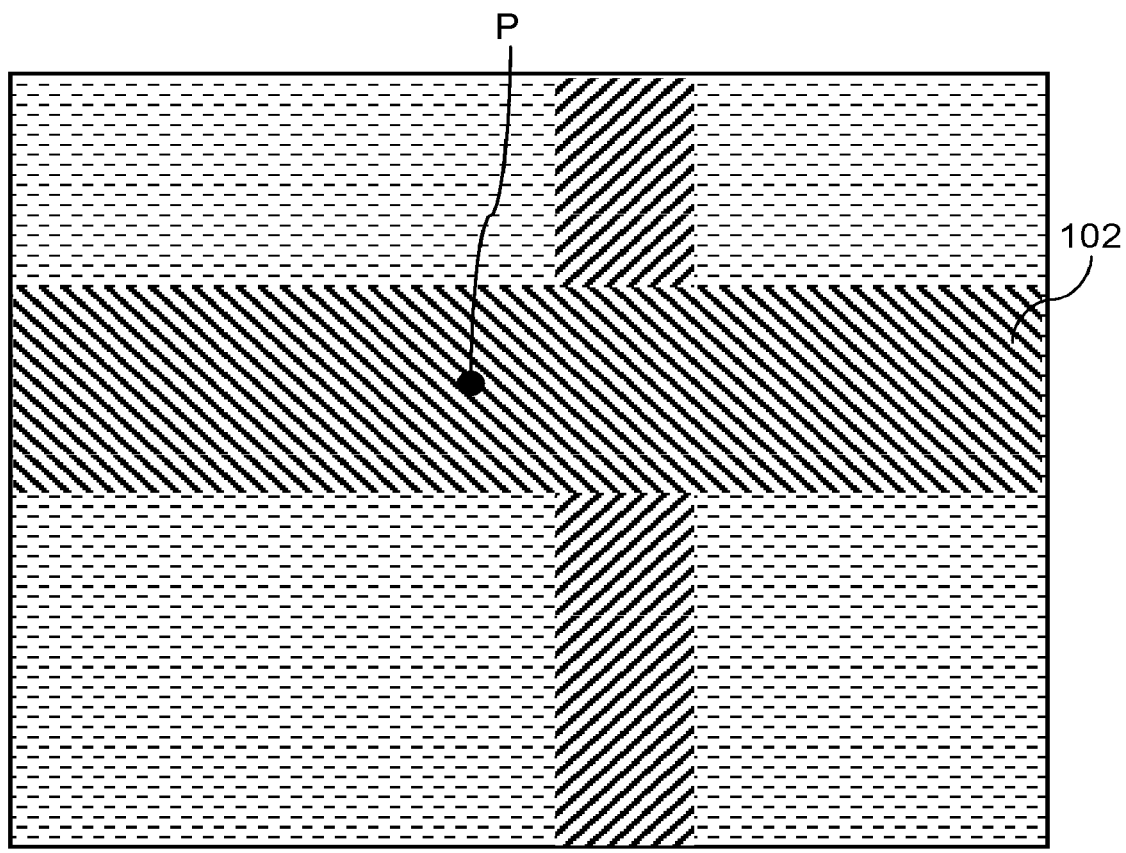
FIG. 2 schematically shows an example of a thermal image photographed with an infrared camera.

Infrared camera 20 photographs an object at a predetermined frame rate, thereby producing thermal image data (video data) indicating a temperature of the object. Infrared camera 20 is disposed under bridge 101, and photographs a predetermined region (measuring region) of the underside of bridge 101, thereby producing data of a thermal image (thermal image data) indicating a temperature of the predetermined region. Each pixel of the thermal image has its own temperature information. FIG. 2 schematically shows an example of the thermal image produced by infrared camera 20. The data of the thermal image is an example of thermal data.

Laser displacement meter 30 measures a displacement of the surface of the object with a laser beam casted to the object, and outputs a result of measurement as displacement data. To be more specific, laser displacement meter 30 casts the laser beam to a part of the measuring region to be photographed with infrared camera 20, thereby measuring the displacement of the part. For instance, as shown in FIG. 2, laser displacement meter 30 casts a laser beam to measuring point P on structure 102 of bridge 101, where structure 102 is located in the measuring region (=the image region shown in FIG. 2), thereby measuring the displacement of measuring point P. The displacement data includes information to be converted into stress, and is an example of data on the stress. The displacement data is not necessarily an amount of displacement (e.g. 1 mm), but it can be a general idea including the information indicating an amount of displacement (e.g. an output signal supplied from laser displacement meter 30).

Stress measurement device 10 measures a stress distribution occurring in a predetermined region of bridge 101 based on the thermal image data supplied from infrared camera 20 and the displacement data obtained by laser displacement meter 30. Stress measurement device 10 then transmits the stress data measured to a server via network 2 (e.g. the Internet). The data supplied from the infrared camera and the laser displacement meter are stored time-synchronously in stress measurement device 10, or they are stored to be time-synchronous with time stamps recorded in each of the data.

Figure 3:
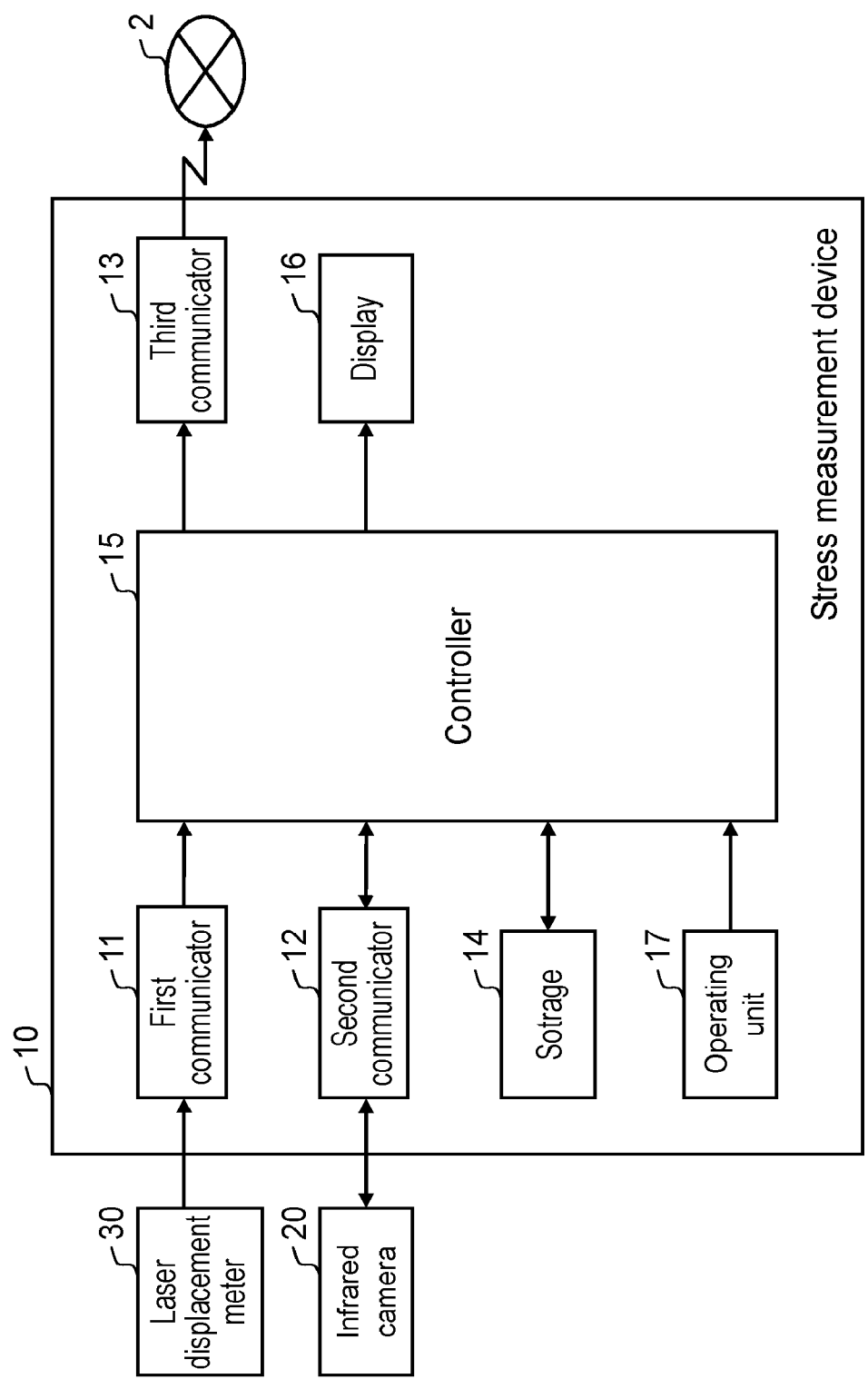
FIG. 3 is a block diagram showing a structure of a stress measurement device.

Stress measurement device 10 is detailed hereinafter. It is formed of, for example, a computer. FIG. 3 is a block diagram showing a structure of stress measurement device 10, which includes first to third communicators 11, 12, and 13, storage 14, controller 15, display 16, and operating unit 17.

First and second communicators 11 and 12 work as interface circuits for connecting themselves to external devices respectively, and carry out the communication conforming to communication interfaces (communication module) such as USB, HDMI (registered marks).

First communicator 11 is connected to laser displacement meter 30 for receiving the displacement data from laser displacement meter 30.

Second communicator 12 is connected to infrared camera 20, and sequentially receives the thermal image data photographed at a predetermined frame rate from camera 20. Second communicator 12 also receives control information about actions on photographing-start and photographing-end of camera 20 from controller 15, and transmits the control information to camera 20.

Third communicator 13 is formed of a radio-communication interface conforming to a communication standard (e.g. IEEE 802, 11, 3G, LTE). Third communicator 13 connects stress measurement device 10 (i.e. controller 15) to network 2.

Storage 14 is a recording medium for recording data, and is formed of, for instance, HDD or SSD. Storage 14 stores the displacement data measured with laser displacement meter 30 and received via first communicator 11. Storage 14 also stores the thermal image data photographed with infrared camera 20 and received via second communicator 12. Storage 14 further stores various programs to be executed by controller 15. The data obtained from the infrared camera and the laser displacement meter are stored time-synchronously in stress measurement device 10, or stored to be time-synchronous with a time stamp recorded on each data.

Controller 15 is formed of CPU, MPU or the like, and executes the various programs stored in storage 14, thereby controlling the entire operation of stress measurement device 10. Controller 15 measures the stress distribution occurring in bridge 101 based on the thermal image data photographed with infrared camera 20. Controller 15 then transmits the stress data thus measured to the server via network 2. The functions of controller 15 will be detailed later.

Display 16 is formed of, for instance, a liquid crystal display or an organic EL display, and displays the stress distribution found by controller 15 in, for instance, color information or gray-scale information.

Operating unit 17 is formed of, for instance, a keyboard, touch panel, or buttons. A user gives an instruction to stress measurement device 10 via operating unit 17.

1-2. Action

The actions of stress measurement device 10 discussed above are demonstrated hereinafter.

Stress measurement device 10 in accordance with this first embodiment finds the stress occurring in the measuring object from the thermal image data produced by infrared camera 20. The thermal image photographed with infrared camera 20 includes the heat produced by the stress occurring in the measuring object, and also sometimes includes a thermal component produced by disturbance such as sunlight or reflected light. The stress found from the thermal image thus includes factors (noises) due to the disturbance in addition to the original stress. It is necessary to eliminate the disturbance component from the stress found from the thermal image in order to obtain more accurate stress.

Stress measurement device 10 in accordance with this first embodiment thus finds the disturbance component with the aid of the measurement result measured with laser displacement meter 30, and then eliminates the disturbance component from a stress value found from the thermal image data, so that the stress occurring in the measuring object can be found more accurately. The ways of calculating and eliminating the disturbance component are demonstrated hereinafter.

1-2-1. Calculation and Elimination of Disturbance Component

Figure 4:
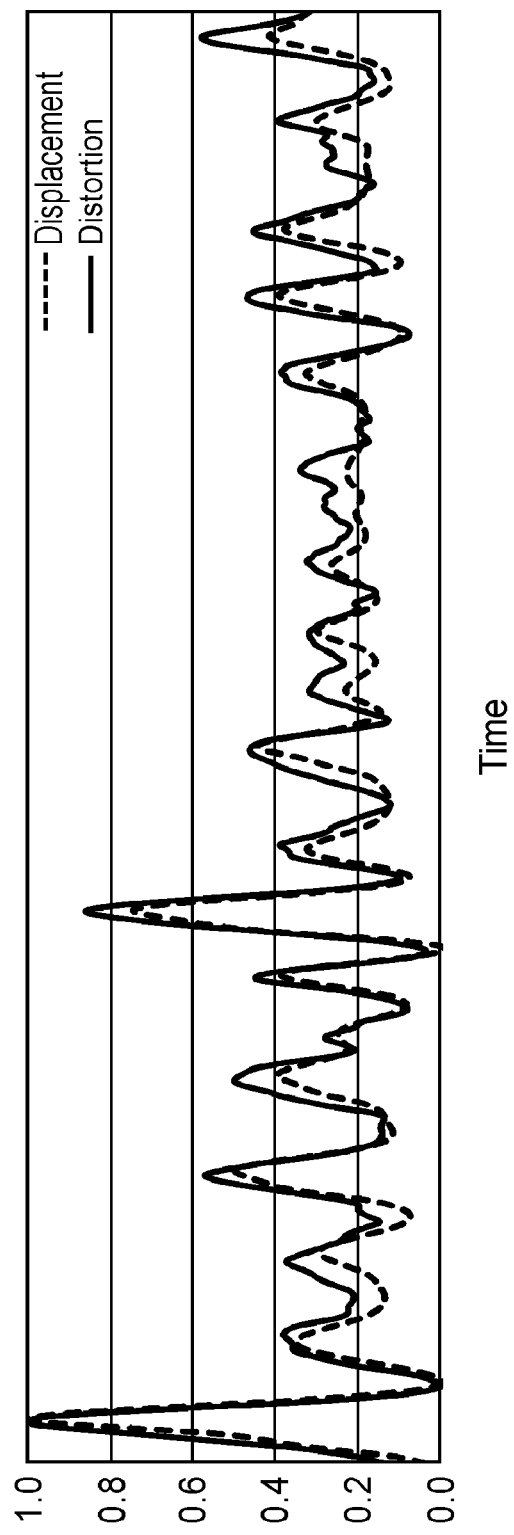
FIG. 4 illustrates a correlation between a waveform (of distortion) showing a result of a distortion measured with a distortion gauge and a waveform showing a displacement measured with a laser displacement meter.

The inventors of the present application measure a distortion of the measuring object with a distortion gauge, and measure the displacement of the measuring object with the laser displacement meter. FIG. 4 shows a comparison between the measurement result with the distortion gauge and the measurement result with the laser displacement meter. In FIG. 4, the solid line represents the measurement result of distortion measured with the distortion gauge, and the broken line represents the measurement result of displacement measured with the laser displacement meter. In FIG. 4, the distortion measured with the distortion gauge and the displacement measured with the laser displacement meter are both normalized. FIG. 5 shows a correlation numerically between the measurement result measured with the distortion gauge and the measurement result measured with the laser displacement meter.

FIG. 4 and FIG. 5 illustrate that there is a very high correlation between the waveform of the distortion measured with the distortion gauge and the waveform of the displacement measured with the laser displacement meter. In other words, both of the distortion measured with the distortion gauge and the displacement measured with the laser displacement meter vary alike. The distortion and the stress are in a proportional relation. Based on these facts, the inventors consider that the measurement result with the laser displacement meter can be used as the information indicating changes in the original stress occurring in the measuring object. The inventors thus consider that a deduction of the value measured with the laser displacement meter from the stress found from the thermal image allows calculating the disturbance component. The inventors further consider that a deduction of the disturbance component from the stress obtained from the thermal image allows finding the original stress including no disturbance component. Incidentally, the disturbance component is found from a part of the measuring region. Assume that the disturbance is available uniformly in the entire measuring region, and a value of the disturbance component found in the part of the measuring region is applicable to the entire measuring region. Based on the idea discussed above, the inventors of the present application invent the stress measurement system of the present disclosure.

1-2-2. Process of Stress Measurement

Figure 6:
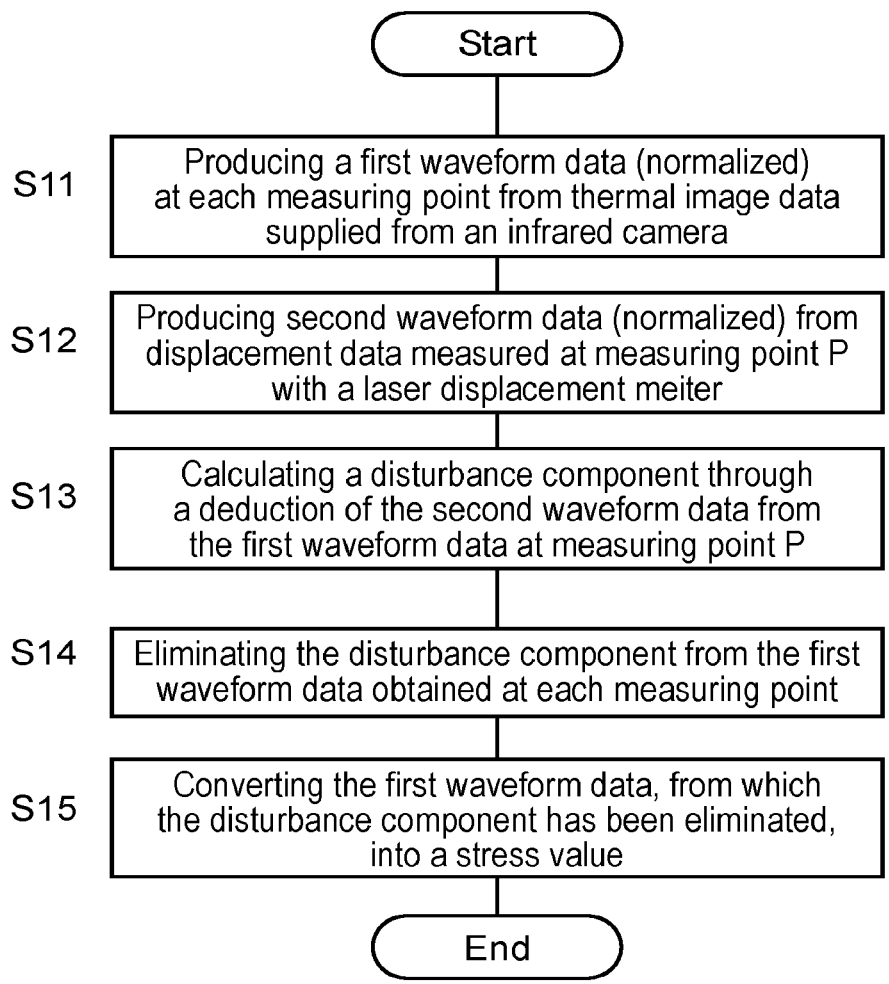
FIG. 6 is a flowchart of a process of a stress measurement carried out by the stress measurement device.

The process of stress measurement done by stress measurement device 10 in accordance with the first embodiment is demonstrated hereinafter with reference to the flowchart shown in FIG. 6.

Controller 15 of stress measurement device 10 produces first waveform data, normalized at each measuring point in the measuring region, from the thermal image data produced by infrared camera 20 (S11). The first waveform data can be obtained in the following manner.

Controller 15 obtains the thermal image data from infrared camera 20 via second communicator 12, and finds a temperature change with time at every measuring point from the thermal image data obtained. Controller 15 then produces stress waveform data indicating stress at every measuring point based on the temperature change. Each of the measuring points can correspond to each of the pixels of the thermal image, or can correspond to a region including multiple pixels. FIG. 7A shows an example of the stress waveform data thus obtained from the thermal image data. Incidentally, a time-stamp is recorded on every frame of the thermal image data supplied from infrared camera 20.

The stress waveform data then undergoes an HPF (high pass filter) process to eliminate a low pass component. FIG. 7B shows an example of the stress waveform data having undergone the HPF process. The stress waveform data having undergone the HPF process (e.g. shown in FIG. 7B) further undergoes an LPF (low pass filter) process to eliminate a high pass component. FIG. 7C shows an example of the stress waveform data having undergone the HPF process and the LPF process. Finally, the stress waveform data (e.g. shown in FIG. 7C) is normalized such that the maximum value of amplitude becomes 1, whereby dimensionless first waveform data is obtained.

Figure 8A:
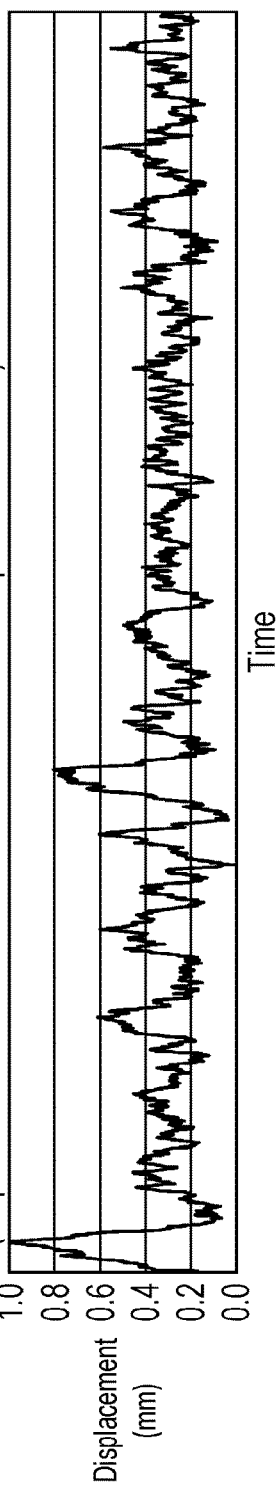
FIG. 8A shows displacement waveform data indicating the displacement measured with the laser displacement meter.
Figure 8B:
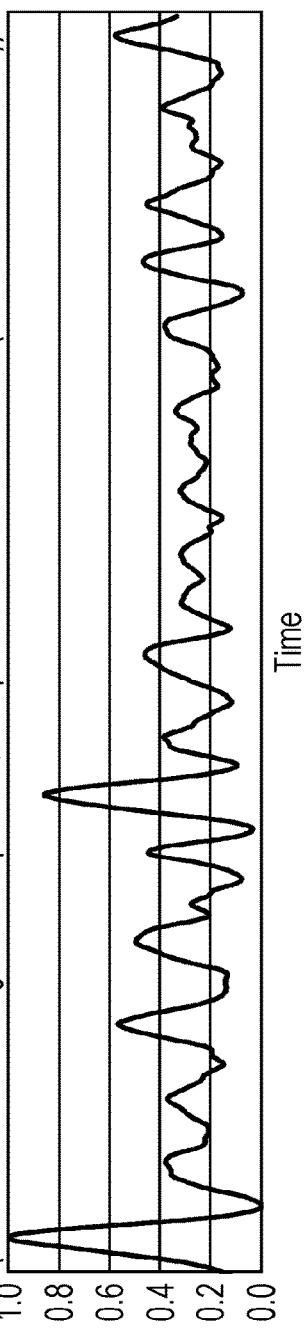
FIG. 8B shows the waveform data shown in FIG. 8A, but having undergone the HPF process, LPF process, and normalization.

Next, controller 15 produces second waveform data that is normalized from the displacement data measured at a measuring point in the measuring region with laser displacement meter 30 (S12). This second waveform data is synchronized timewise with the first waveform data, and the data is used from the same range as that of the first waveform data. The second waveform data can be found in the following manner:

Laser displacement meter 30 measures a displacement at a measuring point (e.g. measuring point P in FIG. 2) in the measuring region. Controller 15 obtains the displacement data supplied from laser displacement meter 30 via first communicator 11. FIG. 8A shows displacement waveform data produced from the displacement data supplied from laser displacement meter 30. Controller 15 then provides the displacement waveform data with the HPF process and the LPF process. They are the same processes provided to the stress waveform data supplied from the thermal image data. The resultant displacement waveform data is then normalized such that the maximum value of amplitude becomes 1, whereby the second waveform data is obtained. FIG. 8B shows the second waveform formed by putting the waveform data shown in FIG. 8A in the HPF process, LPF process and normalization.

Controller 15 then deducts the second waveform data (having undergone the normalization) from the first waveform data (having undergone the normalization) of the displacement measured at the measuring point, thereby obtaining the disturbance data indicating a disturbance component (S13). Since laser displacement meter 30 measures a displacement at one measuring point (e.g. measuring point P in FIG. 2) in the measuring region, the first waveform data of the same measuring point as this one measuring point shall be used in obtaining the disturbance component. As discussed previously, the waveform supplied from laser displacement meter 30 is used as the information indicating a change in original distortion (i.e. stress) that includes no disturbance (refer to FIG. 4). The deduction of the second waveform data (i.e. original stress including no disturbance) from the first waveform data (i.e. stress including disturbance) thus allows finding the disturbance component included in the first waveform data.

Controller 15 deducts the obtained disturbance data from the first waveform data of each measuring point in the measuring region (S14). In this first embodiment, assume that the disturbance component is uniformly available overall the measuring region, so that the disturbance component found at one measuring point can be applicable to the entire measuring region. In other words, controller 15 carries out a deduction of the disturbance component measured at one measuring point in the measuring region from the first waveform data found from the thermal image data, whereby the first waveform data, from which the disturbance component has been eliminated, can be found.

The first waveform data, from which the disturbance component has been eliminated, is thus found, and this data is a normalized and dimensionless value. Based on the maximum value obtained at a normalization of the stress waveform data, found from the thermal image data, into the first waveform data, an amplitude value of the first waveform data, from which the disturbance component has been eliminated, is converted to a stress value (S15). More accurate stress waveform data having a force dimension (including no disturbance) thus can be found.

In the foregoing instance, the stress waveform data found from the thermal image data and the displacement waveform data found from the measurement result measured with laser displacement meter 30 are normalized, and each one of the normalized waveform data is used for finding the stress waveform data through a deduction of the disturbance component therefrom. However, it is not necessarily to normalize the waveform data in order to find the stress waveform data from which the disturbance component has been eliminated. For instance, the displacement waveform data, measured with laser displacement meter 30, having undergone the HPF process and the LPF process is converted to a stress value with conversion factor α, and the waveform data converted to the stress value is deducted from the stress waveform data (refer to FIG. 7C) that includes the disturbance data and is found from the thermal image data, whereby the disturbance data can be found. Then a deduction of the disturbance data thus found from the stress waveform data measured at each measuring point allows finding more accurate stress waveform data including no disturbance data.

Figure 9:
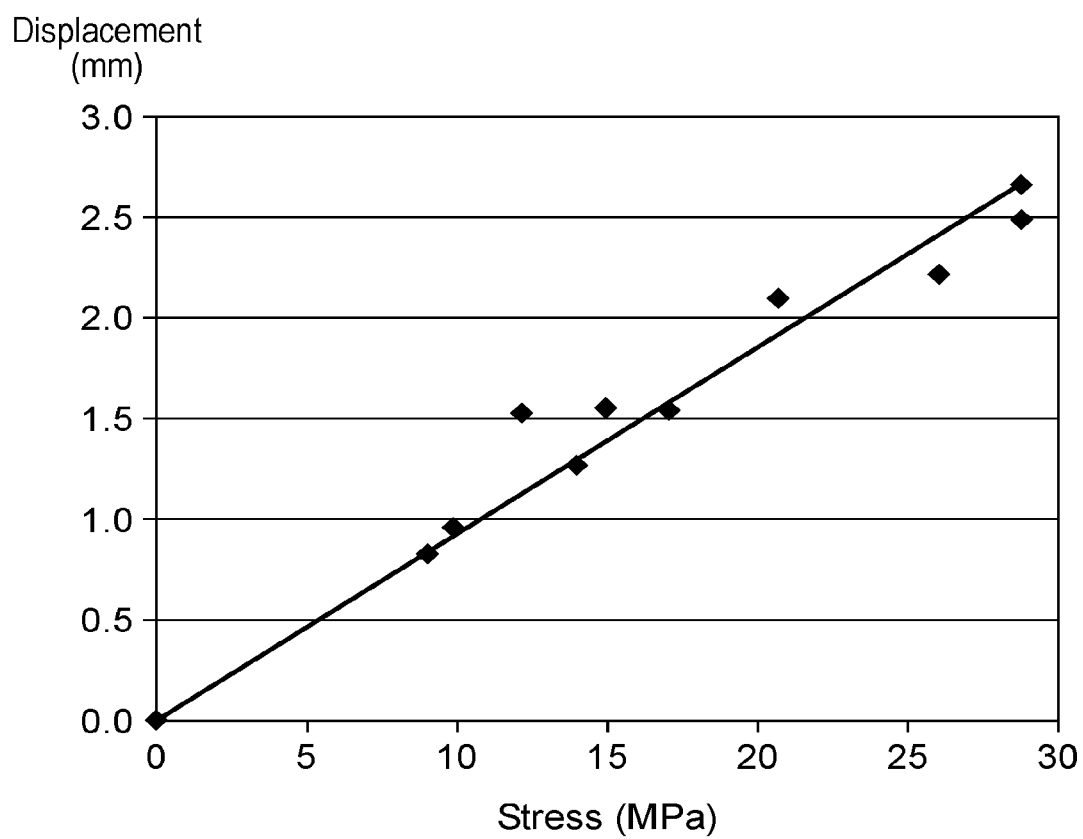
FIG. 9 shows a relation between the stress found based on the thermal image and the displacement measured with the laser displacement meter.

Conversion factor α is a factor for converting the displacement to the stress. This conversion factor α can be found this way: a test vehicle, of which load is already-known, travels on an objective bridge, whereby stress (measured with an infrared camera) and displacement can be measured simultaneously. Here is another way to find conversion factor α Stress (measured with the infrared camera) and displacement measured simultaneously during a travel of an ordinary vehicle allows finding the conversion factor α. FIG. 9 shows a relation between the stress calculated from the thermal image and the displacement calculated by laser displacement meter 30. As shown in FIG. 9, these two factors are correlated with each other. Based on this correlation, conversion factor α is calculated. To be more specific, an inverse number of a slope of the approximation line shown in FIG. 9 is set to conversion factor α.

Figure 8C:
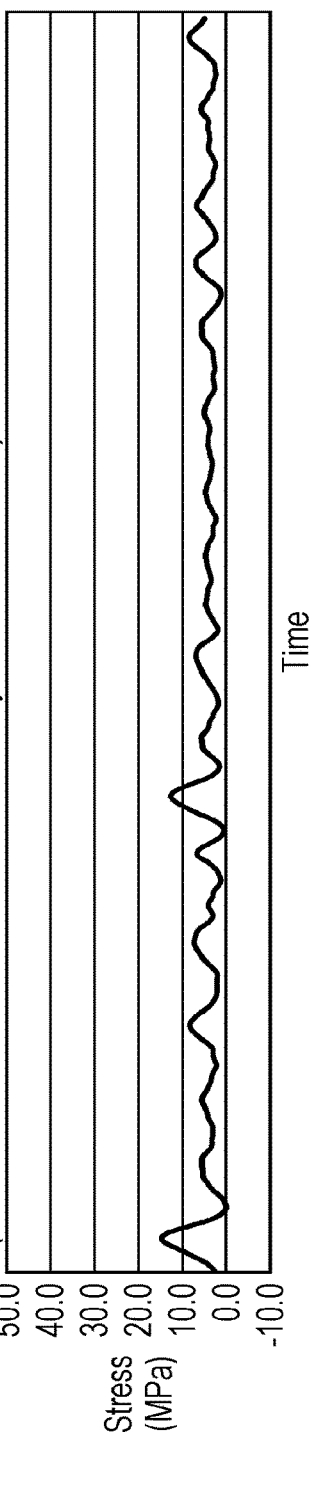
FIG. 8C shows stress waveform data converted by a conversion factor α.

The stress waveform data shown in FIG. 8C can be also found in the following manner different from the flowchart shown in FIG. 6: The normalized first waveform data (based on the thermal image) undergoes a deduction of the disturbance component, then the waveform data obtained based on the thermal image and having undergone the deduction of the disturbance component is formed. This data is converted to displacement data based on the maximum value obtained before the displacement data is normalized. The displacement data from which the disturbance data has been eliminated is thus obtained. Then this data is converted with conversion factor α, so that the stress data shown in FIG. 8C is obtained. The same result as previously discussed can be obtained in the manner discussed above.

1-2-3. Demonstration Result

When a vehicle travels on a bridge of a highway, stress is generated. The occurrence of the stress invites a change in temperature. The stress generated at a structure, which is a part of the bridge of the highway, is actually measured with stress measurement system 1 in accordance with this first embodiment. The measurement result is described below.

Figure 10:
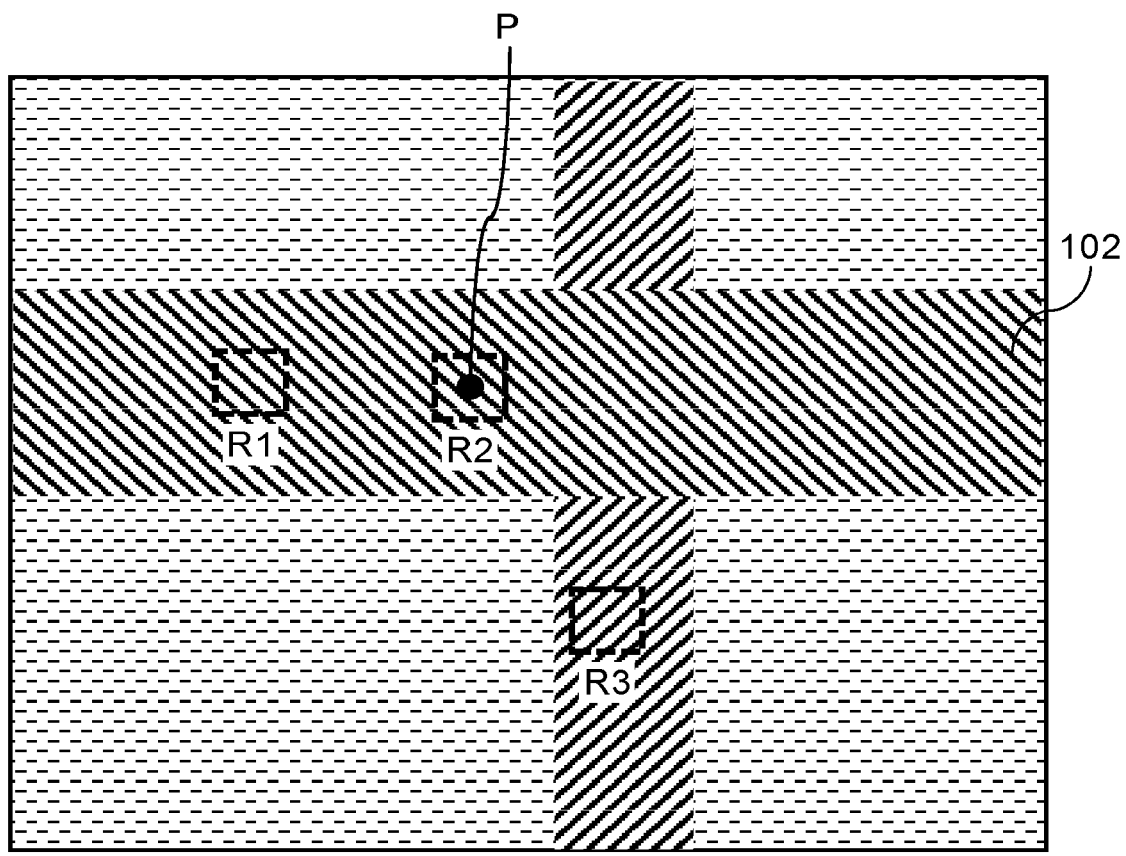
FIG. 10 illustrates three regions R1 to R3 in a structure, and stress is measured of the structure.

FIG. 10 schematically shows a thermal image generated through photographing structure 102, which is a part of bridge 101 (i.e. measuring object), with infrared camera 20. Structure 102 has three measuring regions, R1, R2, and R3. Each region has one measuring point respectively, and stress at each measuring point is measured.

During this measurement, laser displacement meter 30 measures a displacement at measuring point P in measuring region R2 of structure 102. FIG. 11 shows the second waveform data that is obtained this way: the displacement data measured at measuring point P in region R2 has undergone predetermined processes (i.e. HPF process, LPF process, and normalization). The second waveform data does not include a disturbance but includes the information only about stress.

FIG. 12A to FIG. 12C, FIG. 13A to FIG. 13C, and FIG. 14A to FIG. 14C show the measurement results with stress measurement system 1 at each measuring point in measuring regions R1, R2, and R3 of structure 102.

Figure 12A:
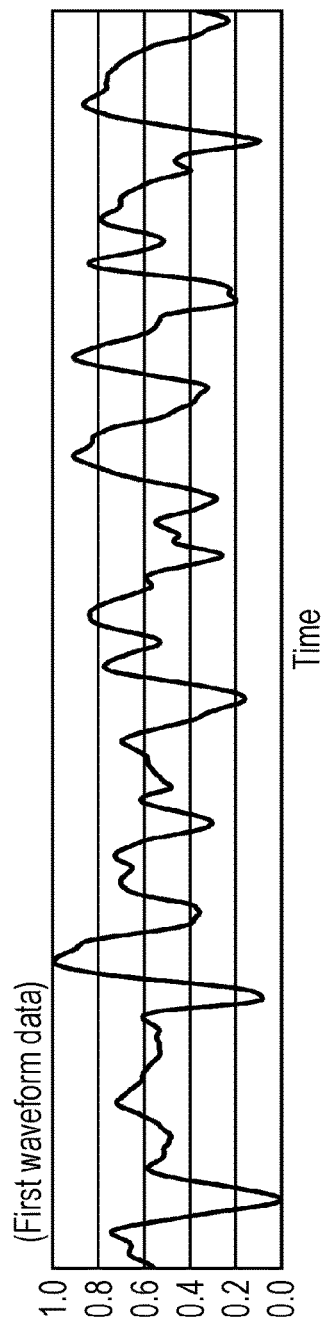
FIG. 12A shows the first waveform data from which a disturbance component, generated from the thermal image data about region 111 shown in FIG. 10, is not yet eliminated.
Figure 12B:
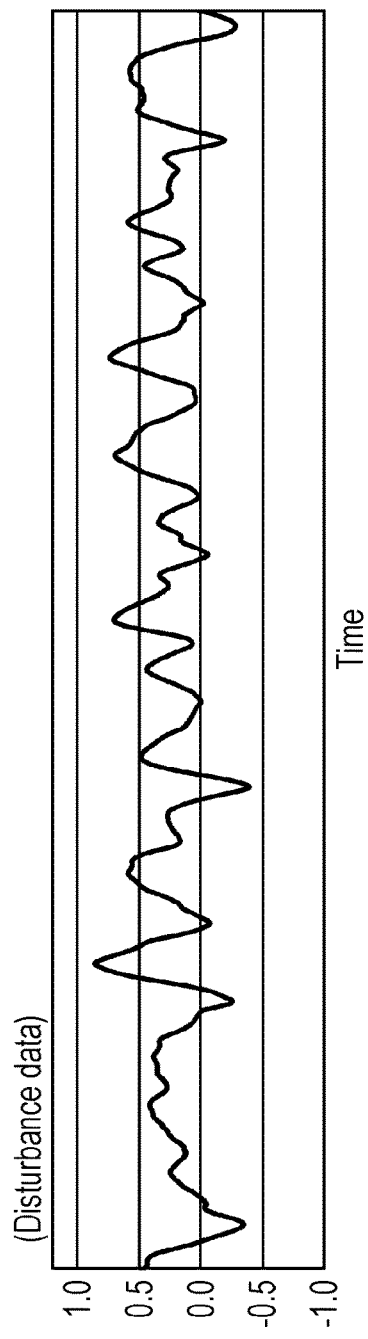
FIG. 12B shows the disturbance data with respect to the first waveform data shown in FIG. 12A.
Figure 12C:
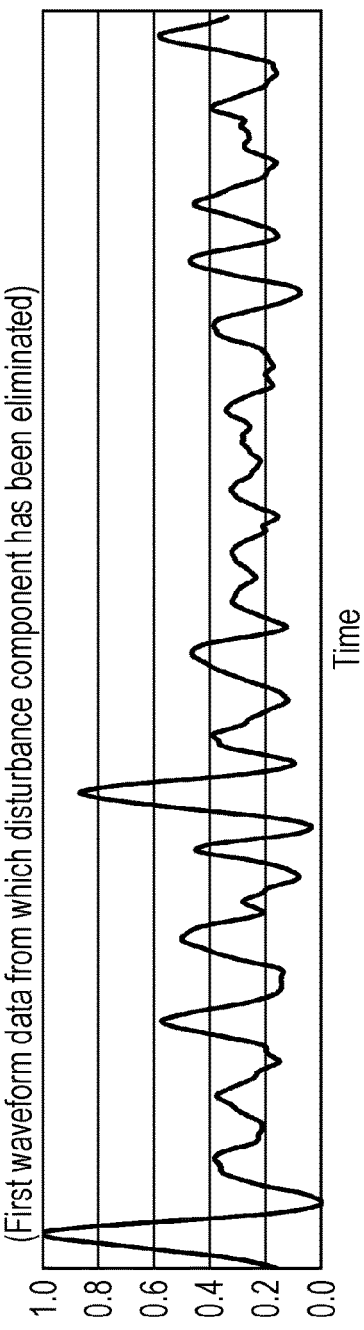
FIG. 12C shows the first waveform data; but the disturbance component has been eliminated from the first waveform data shown in FIG. 12A.

FIG. 12A shows a first waveform data on a measuring point in measuring region R1. This first waveform data includes a disturbance component found from the thermal image. FIG. 12B shows disturbance data of the disturbance component applicable to measuring region R1. This disturbance component employs the disturbance data found based on the data on measuring point P in measuring region R2 (this process will be detailed later). FIG. 12C shows waveform data on the measuring point in measuring region R1. The disturbance component has been eliminated from this waveform data. Since this waveform data has been normalized (i.e. dimensionless), an amplitude value thereof should be converted to a stress value in the end.

Figure 13A:
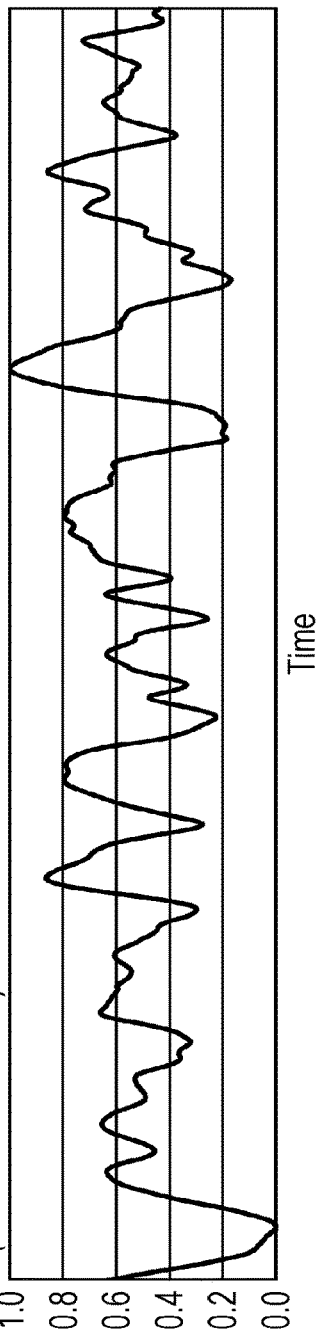
FIG. 13A shows the first waveform data from which a disturbance component, generated from the thermal image data about region R2 shown in FIG. 10, is not yet eliminated.
Figure 13B:
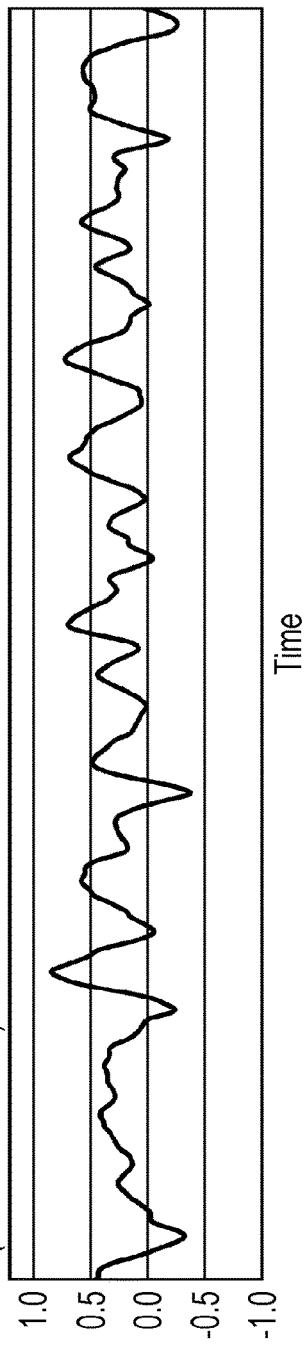
FIG. 13B shows disturbance data with respect to the first waveform data shown in FIG. 13A.
Figure 13C:
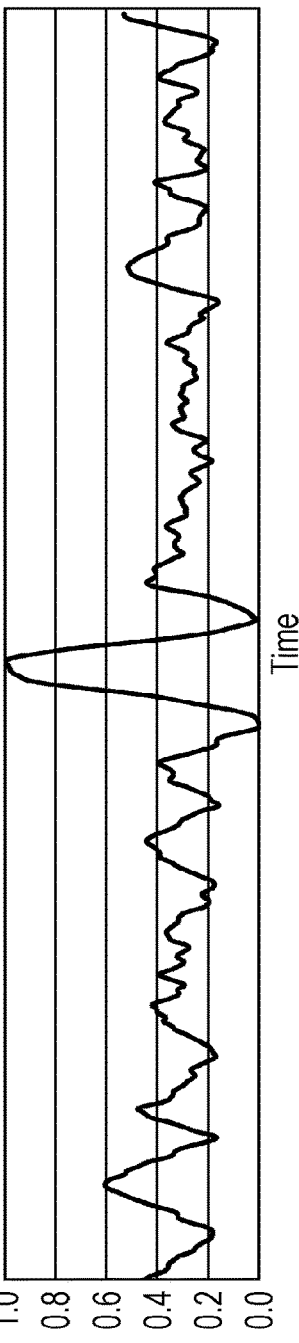
FIG. 13C shows the first waveform data, but the disturbance component has been eliminated from the first waveform data shown in FIG. 13A.

FIG. 13A shows a first waveform data on measuring point P in measuring region R2. This first waveform data includes a disturbance component found from the thermal image data. FIG. 13B shows a disturbance component with respect to measuring point P in measuring region R2. This disturbance component can be found, with respect to measuring point P in measuring region R2, by deducting a value of the second waveform data shown in FIG. 11 from a value of the first waveform data shown in FIG. 13A. FIG. 13C shows waveform data on measuring point P in measuring region R2. The disturbance component has been deducted from this waveform data. An amplitude value of the waveform data shown in FIG. 13C is converted to a stress value, whereby stress waveform data having a force dimension can be obtained.

Figure 14A:
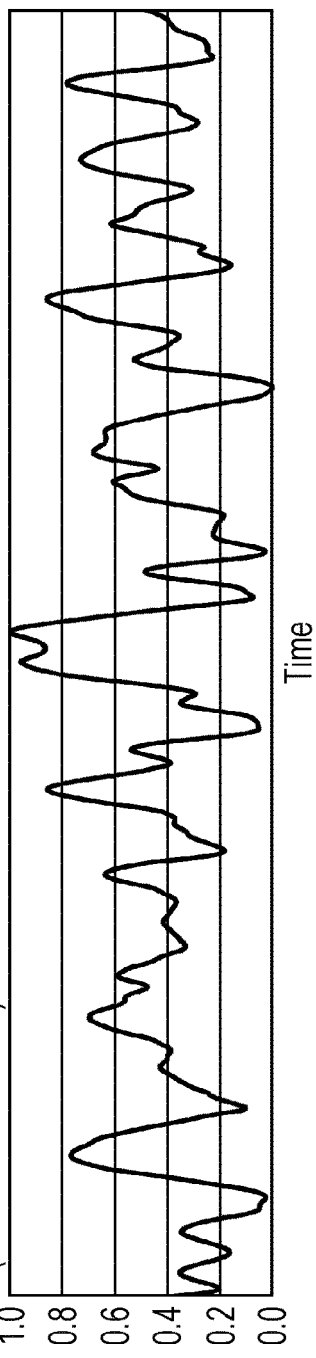
FIG. 14A shows the first waveform data from which a disturbance component, generated from the thermal image data about region R3 shown in FIG. 10, is not yet eliminated.
Figure 14B:
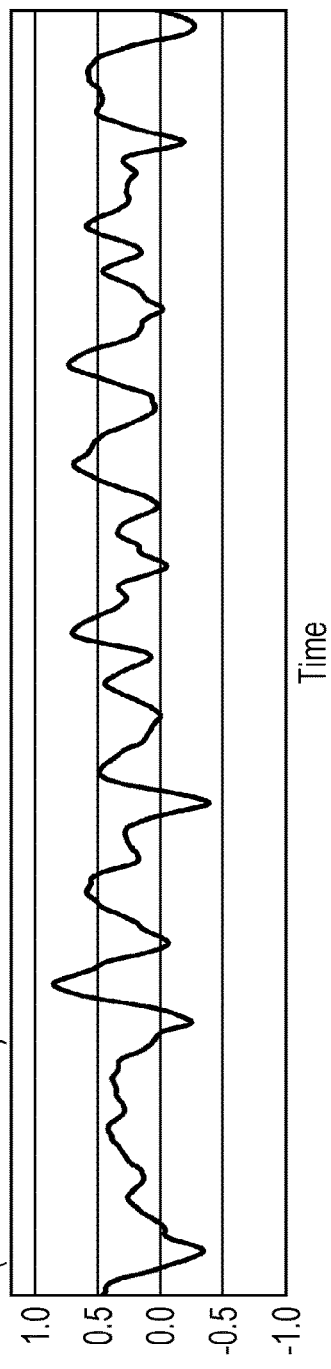
FIG. 14B shows disturbance data with respect to the first waveform data shown in FIG. 14A.
Figure 14C:
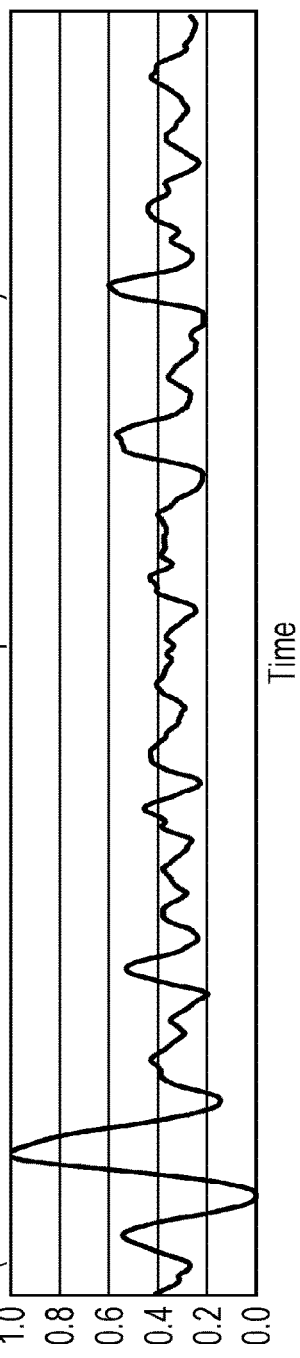
FIG. 14C shows the first waveform data, but the disturbance component has been eliminated from the first waveform data shown in FIG. 14A.

FIG. 14A shows a first waveform data on a measuring point in measuring region R3, and this first waveform data includes a disturbance component found from the thermal image. FIG. 14B shows disturbance data of the disturbance component applicable to measuring region R3. This disturbance component employs the disturbance data found based on the data on measuring point P in measuring region R2 as discussed previously. FIG. 14C shows waveform data on measuring region R3, and the disturbance component has been eliminated from this waveform data. An amplitude value of the waveform data shown in FIG. 14C is converted to a stress value, whereby stress waveform data having a force dimension can be obtained.

1-3. Advantage, and Others

As discussed previously, stress measurement device 10 in accordance with this first embodiment includes the following structural elements:

second communicator 12 (an example of a first obtaining unit) for obtaining thermal image data (an example of thermal data) indicating a temperature of the measuring region of the measuring object;

first communicator 11 (an example of a second obtaining unit) for obtaining the displacement data (an example of data related to stress) including information that is converted to stress occurring in a part of the measuring region; and controller 15 for finding the stress occurring in the measuring region of the measuring object from both of the thermal image data and the displacement data.

Controller 15 obtains the first waveform data respectively on the one part (e.g. measuring point P) of the measuring region of the measuring object and a part other than the one part of the measuring region based on a change with time of the thermal data, and also obtains the second waveform data based on a change with time of the displacement data. Controller 15 deducts the second waveform data from the first waveform data on the part of the measuring region, thereby finding the disturbance component (disturbance data). Then controller 15 deducts the disturbance data from the first waveform data on the part other than the one part of the measuring region, thereby finding stress data indicating the stress occurring in the part other than the one part of the measuring region.

The structure discussed above allows eliminating a disturbance component (e.g. sunlight) from the waveform data that indicates stress and is obtained from the thermal image, whereby more accurate stress data is obtainable.

The first waveform data and the second waveform data are turned to dimensionless ones, so that these two data can be compared with each other as well as can be used in calculations.

Controller 15 multiplies data, obtained through a deduction of the disturbance data from the first waveform data, by a predetermined conversion factor α, thereby finding the stress data.

The displacement data is obtained through the measurement with laser displacement meter 30 that measures a displacement of the measuring object with the aid of a laser beam. The displacement measured with laser displacement meter 30 varies similarly to a distortion of the measuring object, so that the measurement result with laser displacement meter 30 can be used as the information reflecting the measurement result of the stress occurring in the measuring object. Use of this information allows finding the disturbance component.

This first embodiment also discloses a stress measurement method. This method comprises the steps below:

a step of finding first waveform data, based on a change with time of thermal image data (thermal data) including the information of temperature, on one part of a measuring region of a measuring object and a part other than the one part of the measuring region (S11);

a step of finding a second waveform data based on a change with time of displacement data (an example of data about stress) including the information to be converted to the stress occurring in the one part of the measuring region (S12);

a step of finding a disturbance component (disturbance data) through a deduction of the second waveform data from the first waveform data on the one part of the measuring region (S13); and a step of finding stress data indicating the stress occurring in the part other than the one part of the measuring region through a deduction of the disturbance data from the first waveform data on the part other than the one part of the measuring region (S14).

The foregoing method allows eliminating the disturbance component (e.g. sunlight) from the waveform data indicating the stress and obtained from the thermal data, so that more accurate stress data can be obtained.

Second Exemplary Embodiment

The foregoing first embodiment discusses that both of the first waveform data obtained from the thermal image data and the second waveform data obtained from the value (displacement data) measured with laser displacement meter 30 are normalized to be dimensionless data. In other words, the disturbance component is obtained by using the dimensionless first and second waveform data. The second embodiment, on the other hand, finds stress of the measuring object by using the data having a force dimension (Pa) instead of the dimensionless data. The stress measurement system in accordance with this second embodiment has a structure similar to that of the first embodiment.

Figure 15:
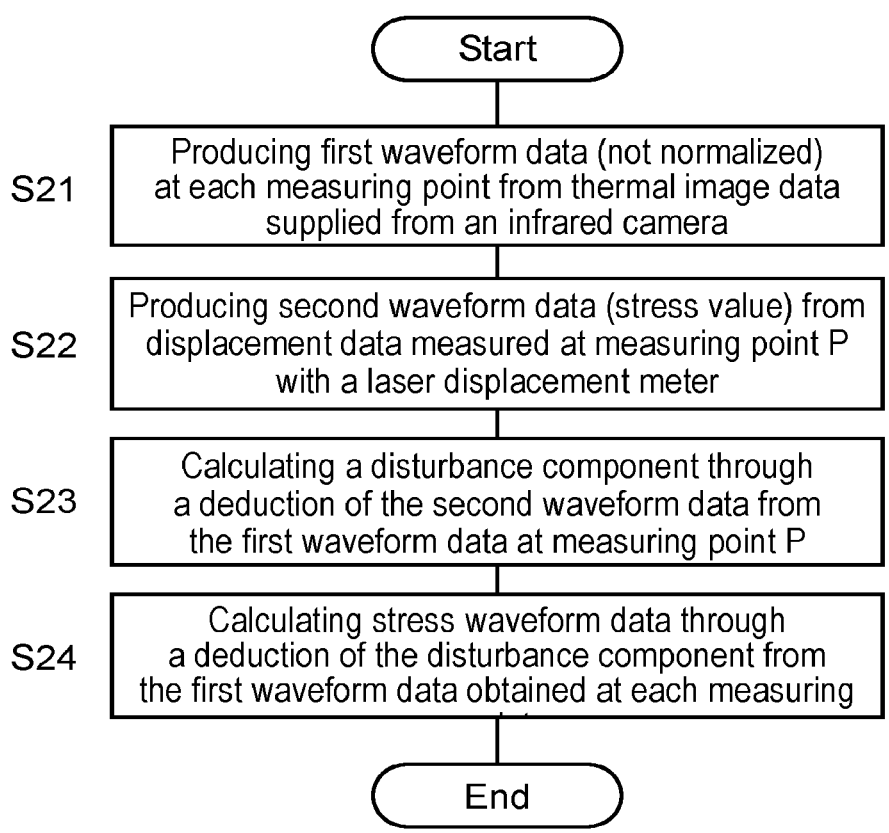
FIG. 15 shows a flowchart of a process of stress measurement to be carried out in a stress measurement system in accordance with a second embodiment of the present disclosure.

FIG. 15 is a flowchart showing a stress measuring process done in stress measurement device 10 in accordance with the second embodiment. This process is demonstrated hereinafter with reference to the flowchart shown in FIG. 15.

Figure 16A:
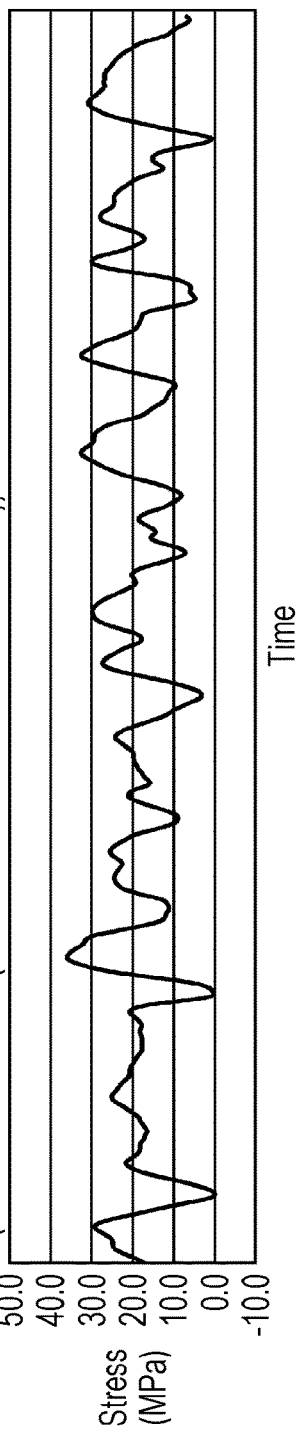
FIG. 16A shows stress waveform data from which the disturbance component, generated from the thermal image data about region R1 shown in FIG. 10, is not yet eliminated.

Controller 15 of stress measurement device 10 generates first waveform data (stress waveform data not normalized) from thermal image data produced by infrared camera 20 (S21). To be more specific, controller 15 obtains the thermal image data from infrared camera 20 via second communicator 12, and then finds an amount of change in temperature from the obtained thermal image. Controller 15 then generates stress waveform data indicating stress at each measuring point in a measuring region of a measuring object based on the amount of change in temperature. The stress waveform data can be found at each pixel of the thermal image data, or can be found from each region including multiple pixels. The stress waveform data then undergoes an HPF process and an LPF process. FIG. 16A shows an example of the first waveform data thus obtained.

Controller 15 then finds second waveform data from displacement data measured with laser displacement meter 30 (S22). The second waveform data is obtained this way:

Controller 15 obtains displacement data on a measuring point (e.g. measuring point P shown in FIG. 2) in the measuring region from laser displacement meter 30 via first communicator 11. In a similar manner to the case of finding the stress waveform data from the thermal image data, controller 15 generates displacement waveform data from the obtained displacement data, and provides this waveform data with the HPF process and the LPF process. Controller 15 then multiplies the displacement waveform data by conversion factor α for converting the displacement to the stress, so that the displacement waveform data is converted to stress waveform data indicating a stress value. The stress waveform data thus found and indicating the stress value is the second waveform data.

Figure 16B:
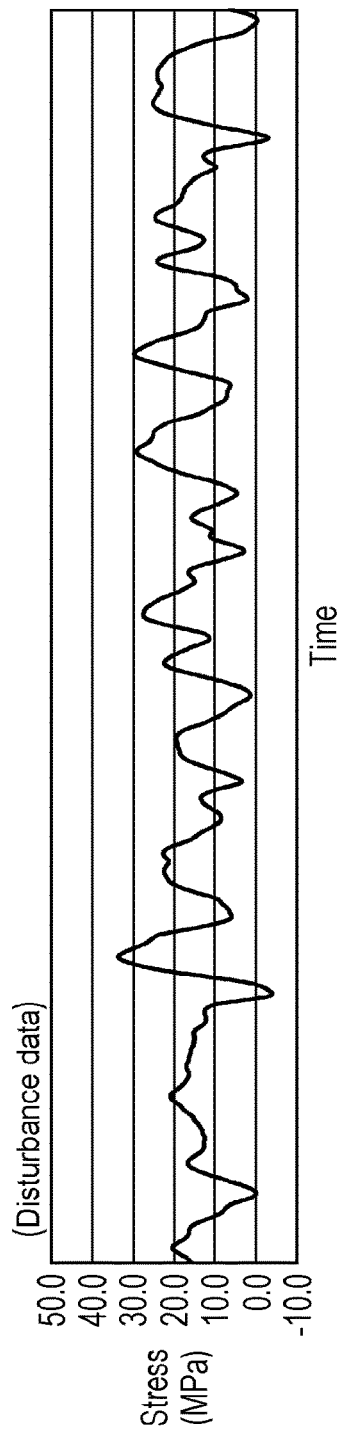
FIG. 16B shows the disturbance data with respect to the stress waveform data shown in FIG. 16A.

Controller 15 then deducts the second waveform data from the first waveform data on the measuring point of the displacement, thereby finding disturbance data indicating a disturbance component (S23). The disturbance data thus found is exhibited with the unit of force. FIG. 16B shows an example of the disturbance data thus obtained.

Figure 16C:
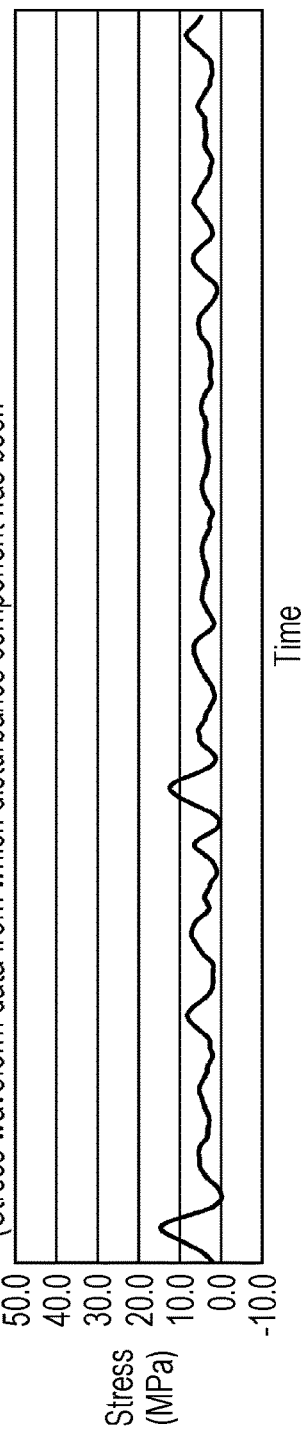
FIG. 16C shows the stress waveform data; but the disturbance component has been eliminated from the stress waveform data shown in FIG. 16A.

A calculation of the disturbance component prompts controller 15 to deduct the disturbance data (disturbance component) from the first waveform data with respect to each measuring point (i.e. each pixel or each region including multiple pixels). This deduction allows finding stress waveform data, from which the disturbance component has been eliminated, with respect to the overall measuring region. FIG. 16C shows an example of the stress waveform data, thus obtained, from which the disturbance component has been eliminated.

As discussed above, although each waveform data is not normalized, the dimensions of each of the waveform data are standardized before the data is processed, whereby the disturbance component can be calculated and eliminated through the deduction from between each of the waveform data. More accurate stress waveform data can be thus obtained.

Third Exemplary Embodiment

Figure 17:
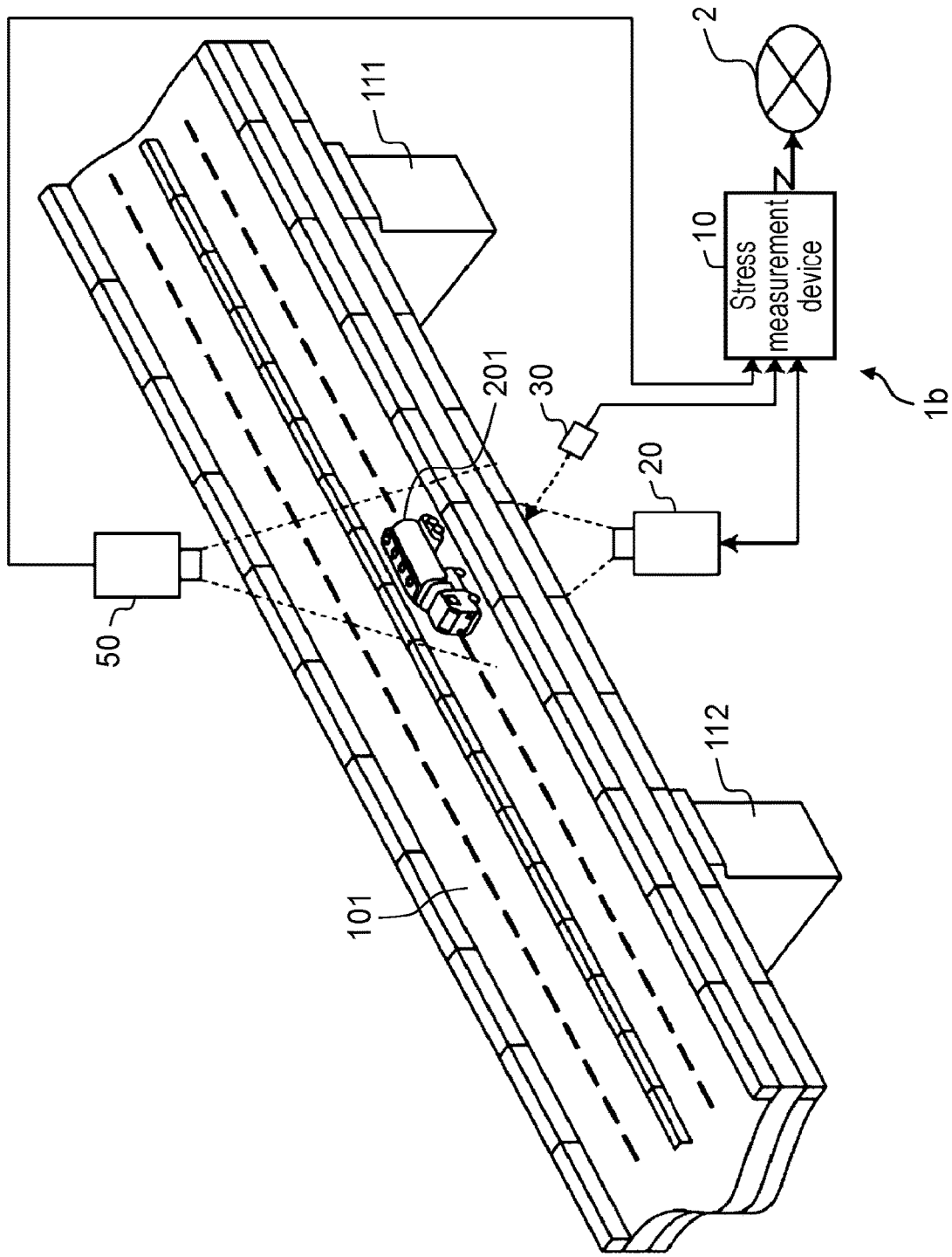
FIG. 17 shows an overall structure of a stress measurement system in accordance with a third embodiment of the present disclosure.

Another embodiment of a stress measurement system is demonstrated hereinafter. FIG. 17 shows a structure of stress measurement system 1b in accordance with the third embodiment. This system 1b includes visible light camera 50 in addition to the structure of the stress measurement system in accordance with the first embodiment.

Visible light camera 50 can photograph an object with visible light. Camera 50 photographs a license plate of a vehicle traveling on bridge 101, and transmits the image data of the shot image to stress measurement device 10, which then analyzes the image data supplied from camera 50 for obtaining the information marked on the license plate. Stress measurement device 10 correlates the obtained information of the license plate with the measured stress waveform data before storing these information and data in storage 14. The stress waveform data is calculated in a similar way to those in the first and the second embodiments.

The information of the license plate allows specifying the vehicle, so that a reference to the stored stress data will allow recognizing the correlation between a type (weight) of the vehicle and the stress occurring when the vehicle travels.

Other Embodiments

The foregoing embodiments 1 to 3 have been demonstrated as the examples of techniques disclosed in the present application; however, the techniques disclosed here are not limited to the embodiments 1 to 3, and are applicable to embodiments in which changes, replacements, additions, or omissions are done appropriately. Each of the structural elements described in embodiments 1 to 3 can be combined with each other to form another embodiment.

In the foregoing embodiment, the bridge built in the highway is used as a measuring object of stress; however, the measuring object is not limited to the bridge in the highway. The stress measurement device and method are applicable to the measurement of stress of any structure or object. For instance, the device and method are applicable to the measurement of stress occurring in construction machinery (e.g. heavy machine), transportation machinery (e.g. vehicle, aircraft, ship), metal machinery (e.g. engine to be mounted in the transportation machinery), and structures formed of resin, composite members, or concrete.

In the foregoing embodiments, when the first and second waveform data are found, the LPF process is provided to the waveform data obtained from the thermal image data produced by infrared camera 20 and also to the waveform data found from the data measured with the laser displacement meter. However, a moving average processing (a moving average filter processing) can be used instead of the LPF process in finding the first and second waveform data.

In the foregoing embodiments, the displacement of the measuring object is measured with the laser displacement meter; however, other measuring devices can be used to measure the displacement.

In the foregoing embodiments, it is assumed that the disturbance component is uniformly available across the measuring region. Nevertheless, if the measuring object is measured with the laser displacement meter from a distance, a wider field of vision will be available. Then, it is possible that the waveform has different phases depending on a place of the measuring object in the measuring region. In this case, multiple laser displacement meters should be used, and the disturbance can differ depending on a place of the measuring object in the measuring region. For instance, a reflection or glare (e.g. heat is reflected, thereby bothering viewers) occurs, the disturbance differs depending on a place where the reflection or glare occurs and a place where no reflection or glare occurs. In such a case, different data should be used for each type of measuring places, and then a waveform, from which the disturbance component is eliminated, should be obtained.

In the foregoing embodiments, the laser displacement meter is used for measuring the displacement (stress) of the measuring object; however, methods other than the method of using the laser displacement meter can be used. For instance, a displacement can be measured from an image by an image correlation method or a moiré method. In the case of using the laser displacement meter, a displacement can be measured two-dimensionally or three-dimensionally.

In the foregoing embodiments, the displacement data measured with the laser displacement meter is used as the data related to stress; however, it is not limited to the use of displacement data, and any data as far as they are convertible into stress can be used. For instance, distortion or acceleration is measured and a conversion factor is found, then the measured distortion or the measured acceleration can be converted to stress with the conversion factor.

FIG. 1 shows the situation of measuring the stress occurring in the bridge when a vehicle travels thereon. Nevertheless, the stress measurement system disclosed here is applicable to a situation where a general vehicle travels. To be more specific, when multiple vehicles travels side by side or in succession, the stress can be measured.

The embodiments discussed above exemplify the techniques disclosed here. The accompanying drawings and detailed descriptions shall be construed to means of assisting ordinary skilled persons in the art to understand the techniques.

The structural elements in the accompanying drawings or the detailed descriptions include not only essential ones for solving the problem but also non-essential ones for solving the problem. The non-essential structural elements are used only for exemplifying the techniques. The appearances of those non-essential elements in the accompanying drawings or detailed descriptions shall not be construed that those non-essential elements are essential ones.

Since the foregoing embodiments exemplify the techniques disclosed here, various changes, replacements, additions, or omissions can be done within the scope of the claims described later.

INDUSTRIAL APPLICABILITY

The present disclosure is applicable to devices for measuring stress occurring in a measuring object in a contactless manner. For instance, the present disclosure is useful for a device that measures stress occurring in a structure such as a bridge of a highway.

What is claimed is:

1. A stress data outputting method executed by at least one processor, the stress data outputting method comprising:
    outputting a stress data indicating pressure occurring in a target area of a region that is different from a predetermined area of the region based on:
        a first thermal data indicating temperature obtained from the target area, and
        a relational data generated by a relation between
            (1) a second thermal data indicating temperature obtained from the predetermined area of the region, and
            (2) a measured stress data measured in the predetermined area of the region,
    wherein the relational data is synchronized timewise with the first thermal data, and
    wherein the predetermined area is a location within and is smaller than the target area.

2. The stress data outputting method according to claim 1, wherein the relational data is generated based on a difference between the second thermal data and the measured stress data.

3. The stress data outputting method according to claim 1, wherein the relational data expresses a disturbance of the predetermined area of the region.

4. The stress data outputting method according to claim 1, wherein the second thermal data and the measured stress data are obtained chronologically.

5. The stress data outputting method according to claim 1, wherein the stress data is a stress waveform indicating the pressure occurring in the target area.

6. A stress data outputting method executed by at least one processor, the stress data outputting method comprising:
    obtaining, from an infrared camera, a first thermal data from a target area of a region;
    obtaining, from the infrared camera, a second thermal data from a predetermined area of the region, the predetermined area being different from the target area;
    measuring, by a laser displacement meter, a stress data in the predetermined area of the region;
    generating a relational data generated by a relation between the second thermal data, and the measured stress data, the relational data being synchronized timewise with the first thermal data; and
    outputting a target stress data occurring in the target area based on the first thermal data and the relational data.

7. The stress data outputting method according to claim 6, wherein the relational data is generated based on a difference between the second thermal data and the measured stress data.

8. The stress data outputting method according to claim 6, wherein the relational data expresses a disturbance of the predetermined area of the region.

9. The stress data outputting method according to claim 6, wherein the second thermal data and the measured stress data are obtained chronologically.

10. The stress data outputting method according to claim 6, wherein the predetermined area is a location within and is smaller than the target area.

11. The stress data outputting method according to claim 6, wherein
    the first thermal data indicates temperature obtained from the target area, the second thermal data indicates temperature obtained from the predetermined area, and the target stress data is a stress waveform indicating pressure occurring in the target area.

\* \* \* \* \*